United States Patent [19]
Hill

[11] Patent Number: 5,942,828
[45] Date of Patent: Aug. 24, 1999

[54] TRANSVERSE FLUX MACHINE

[76] Inventor: Wolfgang Hill, Ortenbergstr. 3, D-76135 Karlsruhe, Germany

[21] Appl. No.: 08/880,765

[22] Filed: Jun. 23, 1997

Related U.S. Application Data

[63] Continuation of application No. PCT/DE95/01807, Dec. 16, 1995, abandoned.

[51] Int. Cl.[6] .......................... H02K 19/00; H02K 19/04; H02K 19/06; H02K 1/22
[52] U.S. Cl. .......................... 310/164; 254/266; 254/257; 254/114; 254/216
[58] Field of Search ..................................... 310/162, 163, 310/164, 216, 254, 266, 112, 114, 268, 257, 67 R

[56] References Cited

U.S. PATENT DOCUMENTS

| | | | |
|---|---|---|---|
| 3,312,842 | 4/1967 | Heuchling et al. | 310/216 |
| 3,560,820 | 2/1971 | Unnewehr | 310/163 |
| 3,774,059 | 11/1973 | Cox | 310/49 |
| 3,806,744 | 4/1974 | Abraham et al. | 310/49 |
| 3,855,486 | 12/1974 | Binder et al. | 310/49 |
| 4,051,401 | 9/1977 | Hayward | 310/216 |
| 4,281,265 | 7/1981 | Eastham et al. | 310/254 |
| 4,347,449 | 8/1982 | Beau | 310/42 |
| 4,392,072 | 7/1983 | Rosenberry | 310/216 |
| 4,613,842 | 9/1986 | Ichiyama et al. | 310/216 |
| 4,682,067 | 7/1987 | Oudet | 310/156 |
| 4,748,361 | 5/1988 | Ohnishi et al. | 310/156 |
| 4,891,538 | 1/1990 | Oudet | 310/162 |
| 5,654,596 | 8/1997 | Nasar et al. | 310/12 |

FOREIGN PATENT DOCUMENTS

| | | |
|---|---|---|
| 597 597 | 5/1934 | Germany . |
| 43 14 513 | 11/1994 | Germany . |
| 1363979 | 8/1974 | United Kingdom . |

*Primary Examiner*—Clayton LaBalle

[57] ABSTRACT

In known transverse flux machines, the losses in the soft magnetic body prevent an increase in efficiency. While the production of the winding is remarkable owing to its simplicity, the production of the laminated iron body conveying the magnetic flux incurs high costs. In addition to the saturation in the iron, the use of air gaps restricts any increase in power density. In accordance with the invention, the two air gaps (21) are arranged radially externally of the winding (15) and the magnetically hard and/or soft magnetic rotor parts (19, 20) which periodically close the magnetic circuit are arranged axially within the ends of the soft magnetic stator body (18). This air gap arrangement gives rise to an air gap surface which is large relative to the external dimensions and the mass of the machine, and also relieves the load on the housing. Owing to the segmentation of this u-shaped stator body, material waste during production is minimized and grain-oriented metal sheets can be used which, owing to their favorable properties, enable the efficiency and power density to be increased. Segments of identical construction can be used in machines having different dimensions and power data. The type of construction according to the invention simultaneously reduces costs, weight, and losses in transverse flux machines.

10 Claims, 6 Drawing Sheets

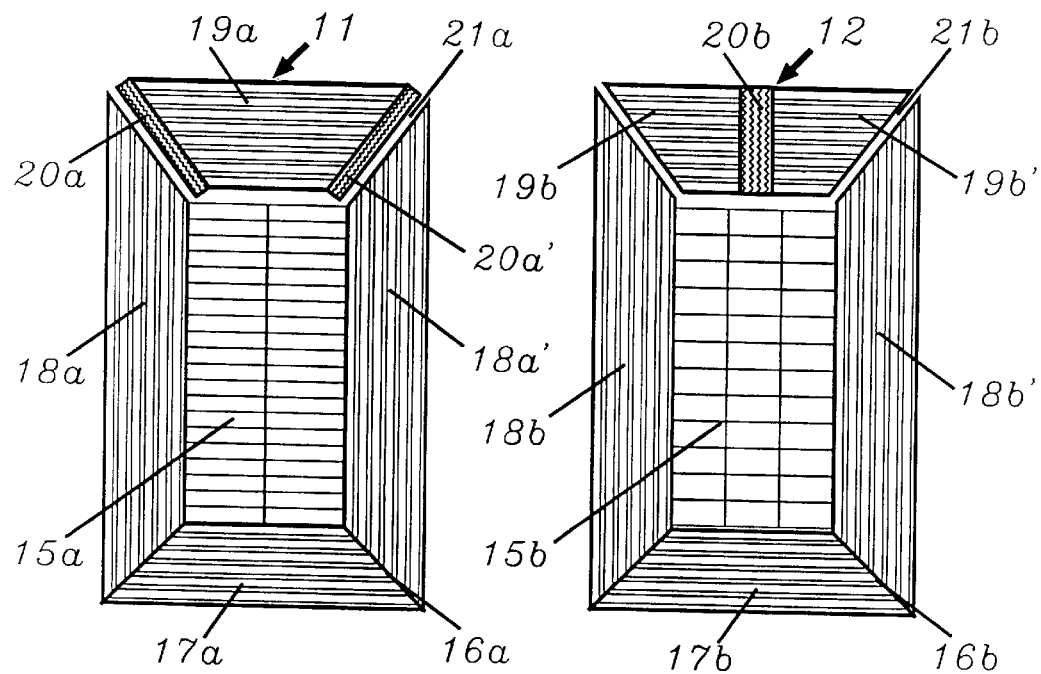
Fig. 3 A
Fig. 3 B
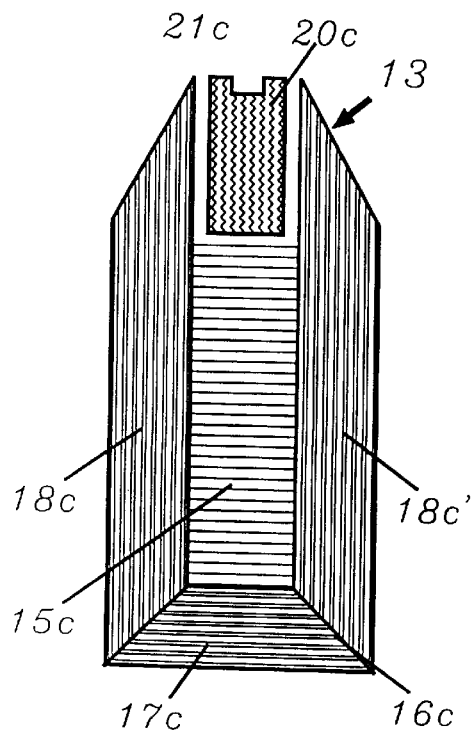
Fig. 3 C
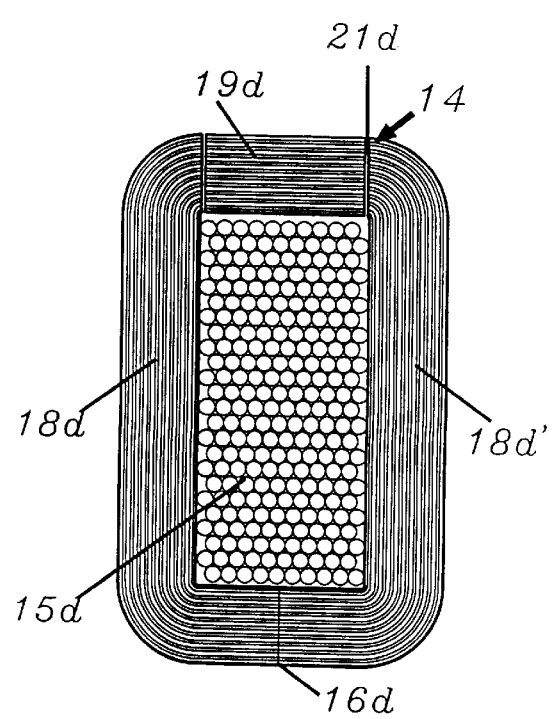
Fig. 3 D

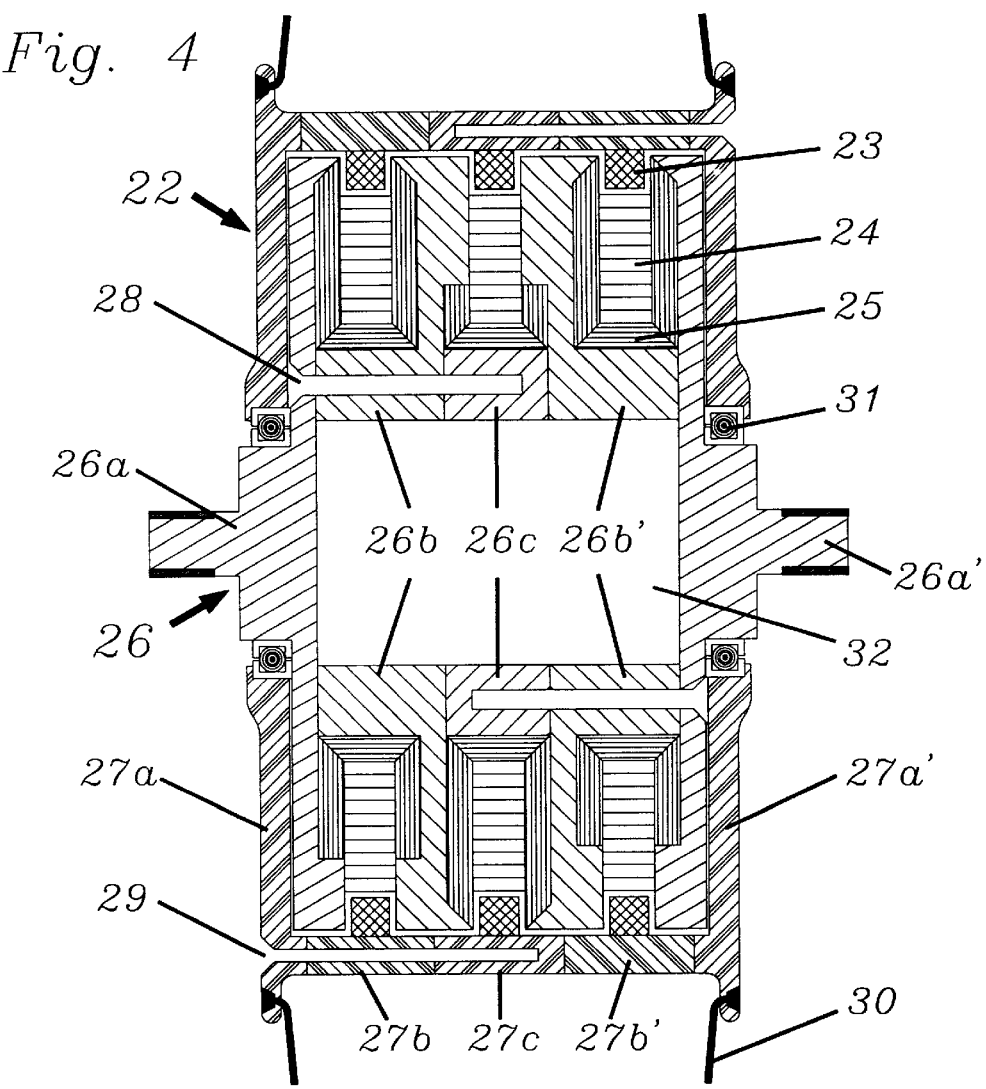
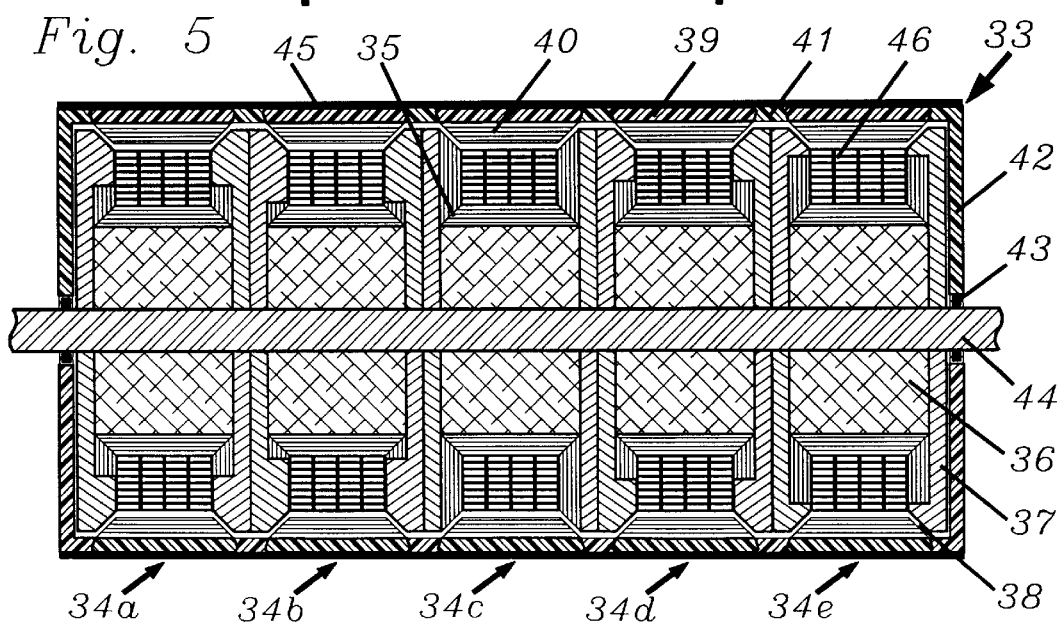

Fig. 6
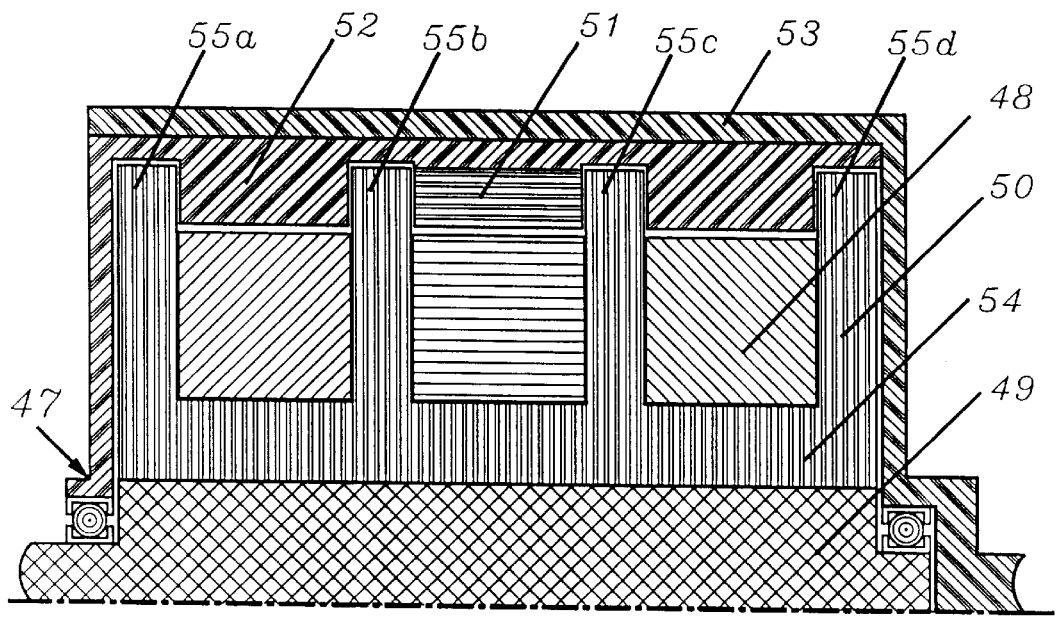
Fig. 7A
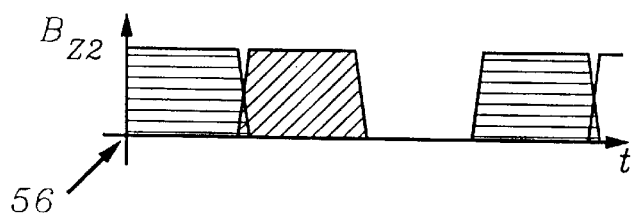
Fig. 7B
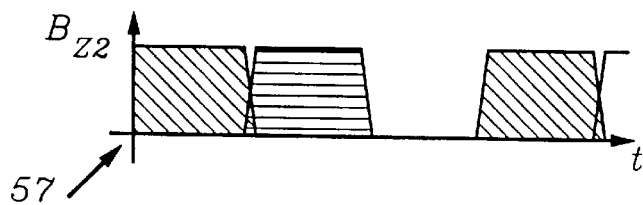
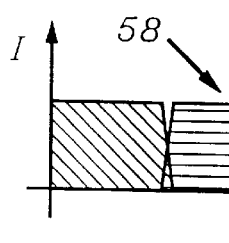
Fig. 7C

TRANSVERSE FLUX MACHINE

This is a continuation of PCT/DE95/01807, filed Dec. 16, 1999 now abandoned.

BACKGROUND OF THE INVENTION

1. Field of the Invention

The invention concerns a transverse flux machine with conductor rings and u-shaped soft magnetic bodies.

2. Description of the Prior Art

A transverse flux machine is impressive because of the simplicity of its winding. On the other hand, the production of the soft magnetic body incurs considerably higher costs.

Material costs are increased by the waste incurred in punching the electric sheets, tool costs are increased by large and complicated dies, and assembly costs are increased by the handling of heavy component parts. The attainable efficiency and/or the power density of the machine are limited due to the saturation flux density of the soft magnetic material and the utilization factor of the air gap surfaces.

In DE 42 23 831 A1, a transverse flux machine is described which shows four winding rings of which two each have different diameters. The rotor elements are inserted axially into the four ring grooves of the stator resulting in a machine with eight air gaps in which the magnetic flux flows in radial direction.

From GB-PS 1 363 979, a transverse flux machine is known in which the rotors are arranged axially between the stators. The stators contain the conductor rings and in each magnetic circuit exist two air gaps with different radii.

From DE-PS 597 597, a single-phase transverse flux machine is known whose u-shaped soft magnetic cores are composed of two parts which are arranged around the conductor ring. The air gaps are located radially within the conductor ring and the dynamic effect of the magnetic field shows the same radial direction in all air gaps. The pulsating radial air gap forces act on the annular rotor housing and generate vibrations, noise, and losses. Therefore, the housing must be of solid and heavy construction.

Also, in the external rotor design known from DE 43 14 513 A1, the magnetic forces of the two air gaps of a magnetic circuit acting vertically with regard to the direction of movement are additive, thereby failing to achieve the objective of maximum power density.

GB 2 161 992 A describes a motor which provides rotary actuation in one direction only and which has u-shaped stator cores consisting of three parts. The piece parts which conduct the magnetic flux of the two phases are separated by a spacer. The magnetic forces acting radially in the air gap are additive.

From DE 43 14 513 A1, external rotor designs of transverse flux machines are known in which the magnetic flux radially within the magnetically active rotor elements flows through the air gap in radial direction. Power density is to be increased by more than 2 air gaps on both sides of the winding arrangement. This air gap arrangement permits the axial sliding into each other of rotor and stator at any time.

Numerous other designs of transverse flux machines are known which, however, utilize the soft magnetic material used only insufficiently and, in terms of production engineering, require costly sheet steel stamping.

The objective of the present invention is, therefore, to advance a transverse flux machine in such a manner that high efficiency and power densities are achieved with lowest possible production expenditures.

SUMMARY OF THE INVENTION

In accordance with the invention, this objective is achieved by the characteristics of claims 1 and 2. In accordance with the invention, the magnetically active bodies which are arranged around the conductor rings have two air gaps each, both of which are arranged radially outside the conductor ring, and wherein the magnetically active rotor parts lie axially within the ends of the soft magnetic stator parts. By this, the pulsating magnetic normal force within the magnetic circuit compensates and the housing is relieved. By this arrangement, the rotor and stator are interlocked with each other. In the assembly, either the stator and rotor rings are placed alternately into position or the rotor ring consists of several identical parts, e.g. two halves. The combination —arrangement of both air gaps of a magnetic circuit radially outside the conductor ring with maximum distance to the rotational axis, and compensation of the air gap forces by the yoke parts which lie within the ends of the u-shaped parts—leads to astonishingly high power densities and efficiencies.

Another basic idea of the invention is the multiple utilization of soft magnetic piece parts of a magnetic circuit by the magnetic fields of adjacent conductor rings of different phases. By this, a higher temporal utilization of the soft magnetic material is achieved in which the weight ratio of this mass which is utilized by the phase-shifted magnetic fields increases with an increasing number of phases. Structural components of different phases consist of identical discs which are arranged axially in series.

Further, in order to facilitate simple assembly and the use of grain oriented stampings, the u-shaped stator cores consist advantageously of several segments which lead the flux predominantly into one direction. In subdivided rotor rings, the stator cores may, however, be prefabricated as single piece, e.g. as grain oriented stamped coil cores.

Advantageous embodiments of the invention are displayed in the drawings.

BRIEF DESCRIPTION OF THE DRAWINGS

FIGS. 3A, 3B, 3C, 3D show four cross sections of different magnetic circuits with hard magnets;

FIG. 4 shows the cross section of a three-phase wheel hub direct drive;

FIG. 5 shows the cross section of a five-phase rotary motor;

FIG. 6 shows the cross section of a three-phase drive with doubly utilized center star disks;

FIGS. 7A, 7B, 7C show the flux and current progressions of the machine in FIG. 6;

DETAILED DESCRIPTION OF THE PREFERRED EMBODIMENT

Figure 1:
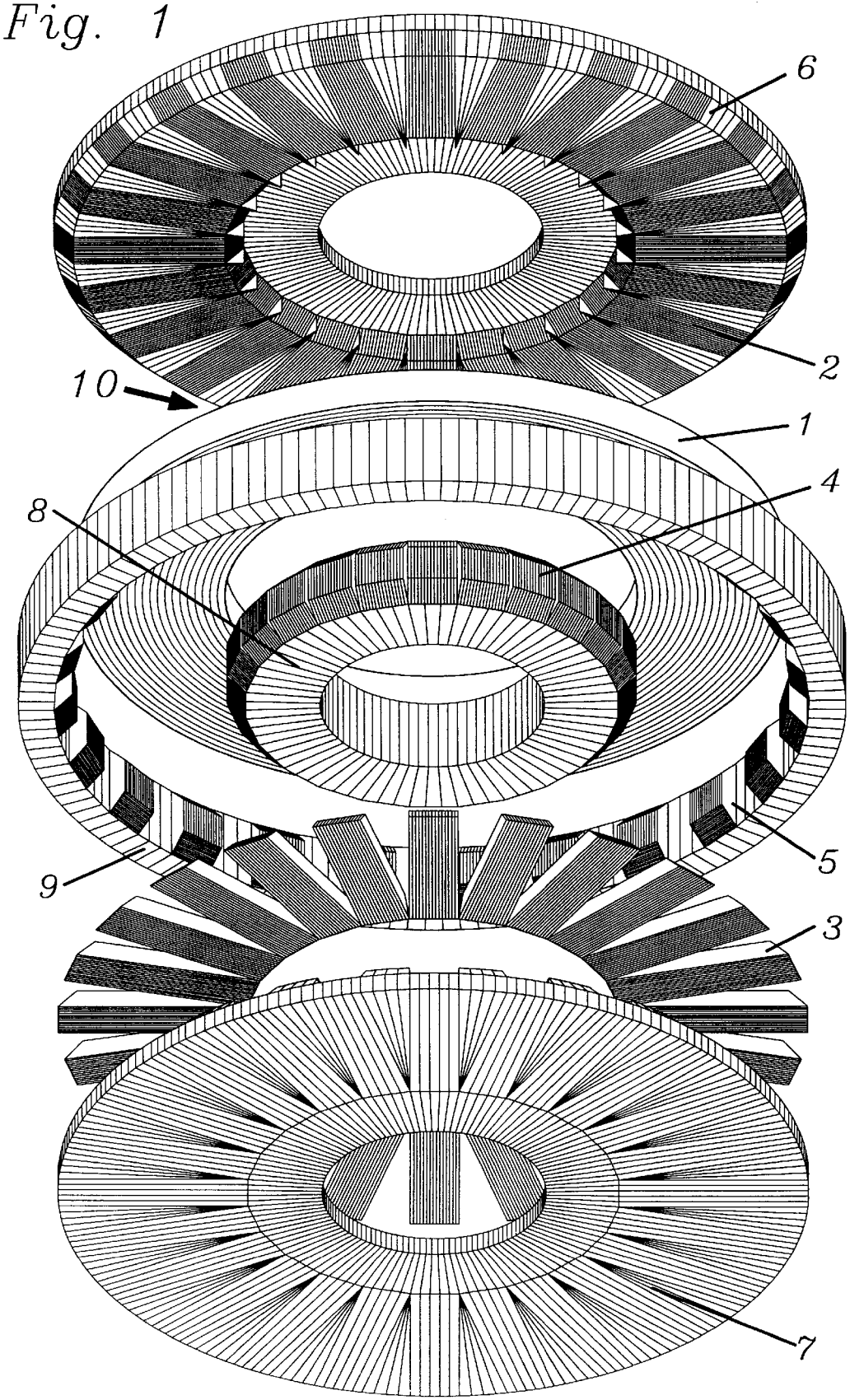
FIG. 1 shows the assembly of a single-phase structural component of a 24-pole transverse flux machine in accordance with the reluctance principle.

FIG. 1 shows the essential design elements of a modularly designed transverse flux machine during assembly. The conductor ring (1) consists of a coiled copper or aluminum strip. Twenty-four evenly spaced soft magnetic bodies are arranged around the circumference of said conductor ring. Each of these bodies which bundle the electrically generated magnetic field consist in turn of four laminated segments (2, 3, 4 and 5) of which the two oppositely situated segments (2 and 3) or (4 and 5) respectively are identical. The two segments (2, 3) which conduct the magnetic flux radially are glued onto carrier discs (6, 7) which consist of magnetically and electrically nonconducting material and wherein the segments (3) are shown axially in front of the carrier disc (7) in order to clarify their design and arrangement. The segments (4, 5) which conduct the magnetic flux axially are glued to carrier rings (8, 9). Besides the conductor ring (1) and the two soft magnetic segments (2, 3) or (4, 5) respectively, the single-phase structural component consists therefore of two identical carrier discs (6, 7) as well as two different carrier rings (8, 9).

Figure 2:
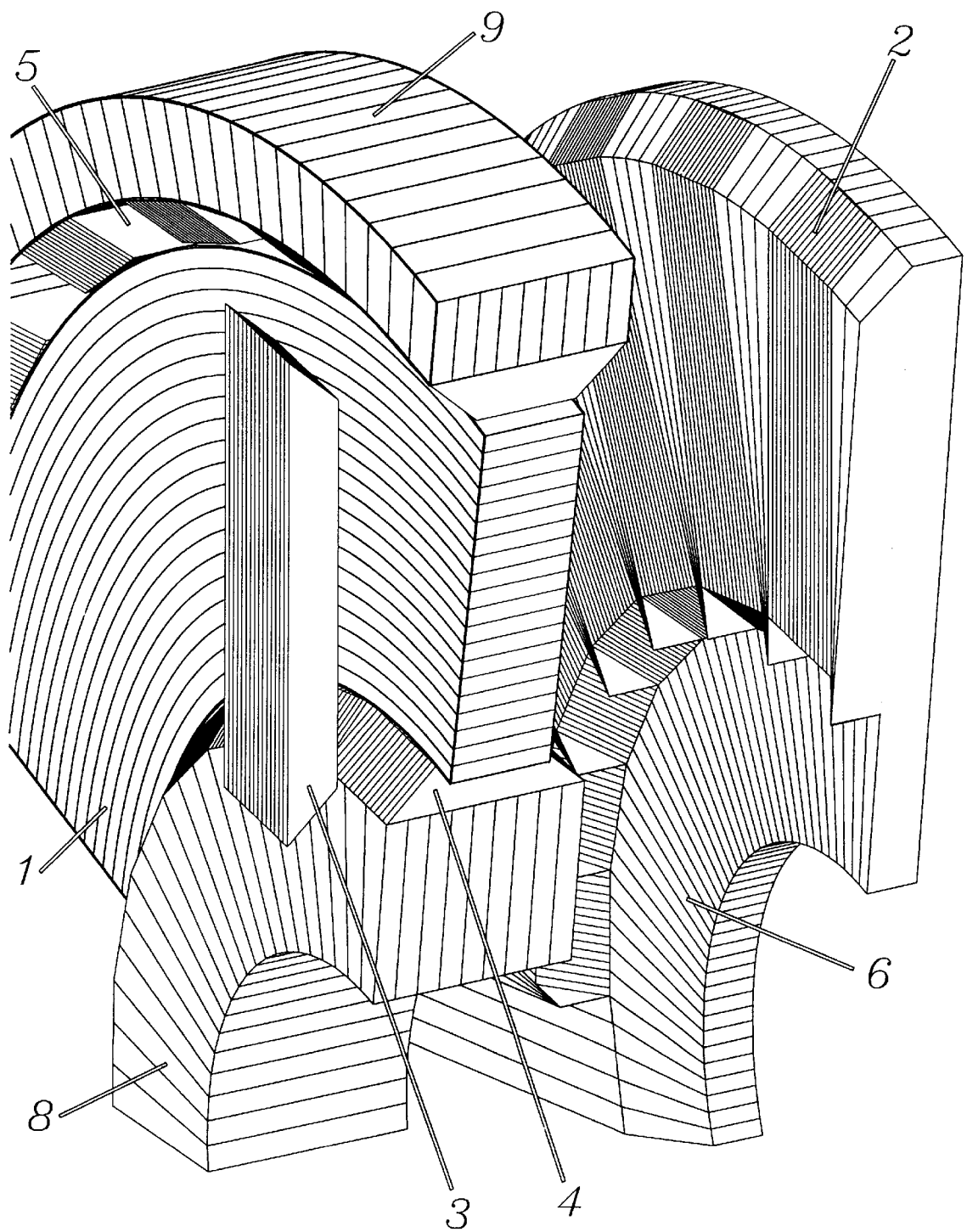
FIG. 2 shows a cutout from FIG. 1.

FIG. 2 shows a cutout from FIG. 1, enlarged. It can be seen how four segments (2, 4, 3, 5) each form a circuit which amplifies the magnetic field around the conductor ring (1). Here, the segments (2, 3, and 4) are abutting and are fixed in their location, while the radially outer segments (5) together with the outer carrier ring (9) rotate around this arrangement during which the resistance of the magnetic circuit varies periodically.

FIGS. 3A, 3B, 3C, 3D show four advantageous structural designs (11 to 14) as cross sections in which the view is limited to the conductor ring (15a–d) and the magnetic body surrounding it.

The conductor rings (15a–d) are enclosed on three sides by the u-shaped soft magnetic bodies (16a–d). These consist of two or three abutting segments (17a–18 d') which conduct the flux predominantly into one direction and wherein the two segments (18a–d) or (18a'–d') respectively which conduct the flux radially are identical. The hard and/or soft magnetic segments (19a, b, d) or (20a–c) respectively which are arranged outside the conductor ring (15a–d) are different from each other.

In design 11 shown in FIG. 3A, the permanent magnets (20a, 20a') arranged at the beveled air gap (21a) decrease the pulsation losses. Thanks to the beveling, a high flux density in the segments (18a, 17a, 18a', 19a) can be achieved with low flux densities in the magnets. The hard magnetic as well as the soft magnetic material is optimally utilized.

In less costly and easier to handle permanent magnets (20b), the outer segment in design 12 shown in FIG. 3B consists of two identical halves (19b, 19b'). The soft magnetic body (16b) which encloses the conductor ring (15b) in a u-shape is identical to the one in FIG. 3A.

In axially very narrow designs 13 shown in FIG. 3C, the outer soft magnetic segments may be deleted. Only an annular permanent magnet (20c) which is magnetized by sectors in axially opposite direction is placed between the ends of the two radial segments (18c, 18c').

With fewer parts, yet with utilization of grain oriented material, design 14 shown in FIG. 3D can be achieved.

It consists of three parts (18d, 18d', 19d) of a rectangular wound stamped coil core (16d). In order to compensate the more strongly pulsating magnetic normal force in the reluctance machine, the narrow air gaps (21d) are arranged radially.

Further, differently prefabricated conductor rings (15a–d) are shown in FIGS. 3A, 3B, 3C, 3D. The two-layer conductor ring (15a) can be advantageously manufactured with two ends lying radially on the outside by appropriately shaping the middle section of a profile wire and winding the two identically long ends in opposite directions. With a multi-layer conductor ring (15b) of profile wire, a high space factor can be achieved, axially narrow machines permit single-layer conductor rings (15c), and at a high number of turns and a groove cross section that deviates from the rectangular shape, condensed conductor rings (15d) of round wire can be used.

In FIG. 4, the cross section of a complete three-phase transverse flux machine (22) is shown as wheel hub direct drive with permanent excitation. The design of the magnetically active part corresponds to FIG. 3D. The magnetic rings (23) consist of plastic bonded rare earths magnets, the single-layer conductor rings (24) of thin conductor coil strip, and the u-shaped soft magnetic bodies (25) of grain oriented electric sheets which have been packeted with baking enamel.

All three single-phase structural components are identical and are held in place, offset in relation to each other by $120°_{el}$, by five retaining elements (26a–c). By utilization of mirror symmetries, only three different retaining element designs are required which are prefabricated as cast parts. The hub (26) which is formed by the retaining elements, as well as the five-part rotor (27a–c) are held together by screws (28, 29) which are inserted alternately from different sides. Forces transmitted from the wheel spokes (30) are transferred via the ball bearings (31) to the hub (26). The drive electronics is housed in a hollow space (32) within the hub.

FIG. 5 shows the cross section of a five-phase transverse flux machine 33 which is executed as a reluctance machine. The identical structural elements (34a–e) are arranged within the stationary part in a tangentially offset manner in relation to each other which causes the cross sections of the u-shaped soft magnetic bodies (35) to be visible at various degrees of completeness. While only two different stationary retaining elements (36, 37) are required, the rotating machine housing, due to the beveled air gaps (38), is composed of five outer retaining rings (39) with soft magnetic segments (40), as well as four spacer rings (41) and the two motor shields (42) which are supported via bearings (43) on the shaft (44). Executed as a rotary motor, the rotor is covered by a rubberized casing (45).

Alternatively, the housing can be executed as stationary and the then rotating conductor rings (46) can be triggered by brushes or co-rotating exciting machines. Additional embodiments, e.g. with a barrel-shaped rotor, can also be realized in accordance with the modular design principle of the present invention.

FIG. 6 represents a three-phase drive (47) in which the three conductor rings (48) are wrapped directly into the comb-shaped soft magnetic bodies (50) which are already positioned on the hub (49). The rotor consists of two halves (52) which contain soft magnetic block segments (51). After radial joining of the halves, a barrel-shaped body (53) is slipped over it axially. The comb-shaped segments consist of tangentially layered stamped parts with radial grain orientation. The common back (54) is executed broader than the four teeth (55a–d) wherein the middle teeth (55b, c) are sequentially flown through by the magnetic flux of the two conductor rings separated by said teeth.

In FIGS. 7A, 7B, 7C, the temporal sequence of the magnetic induction is shown in the two upper line diagrams (56) and (57) in FIGS. 7A and 7B for the second and third tooth (55b, c). The magnetic circuit of the middle conductor ring together with the two magnetic circuits of the adjacent phases utilizes the middle teeth (55b, c), wherein the flow through is staggered and the utilization time is doubled. This multiple utilization results in an increase of the power density. In the three-phase reluctance machine, the currents commutate either—as shown in line diagram (58) in FIG. 7C—in 120°$_{el}$ blocks, so that a constant motor current is flowing, or they overlap in blocks >120°$_{el}$ in such a manner that the moment ripple is decreased.

Figure 8:
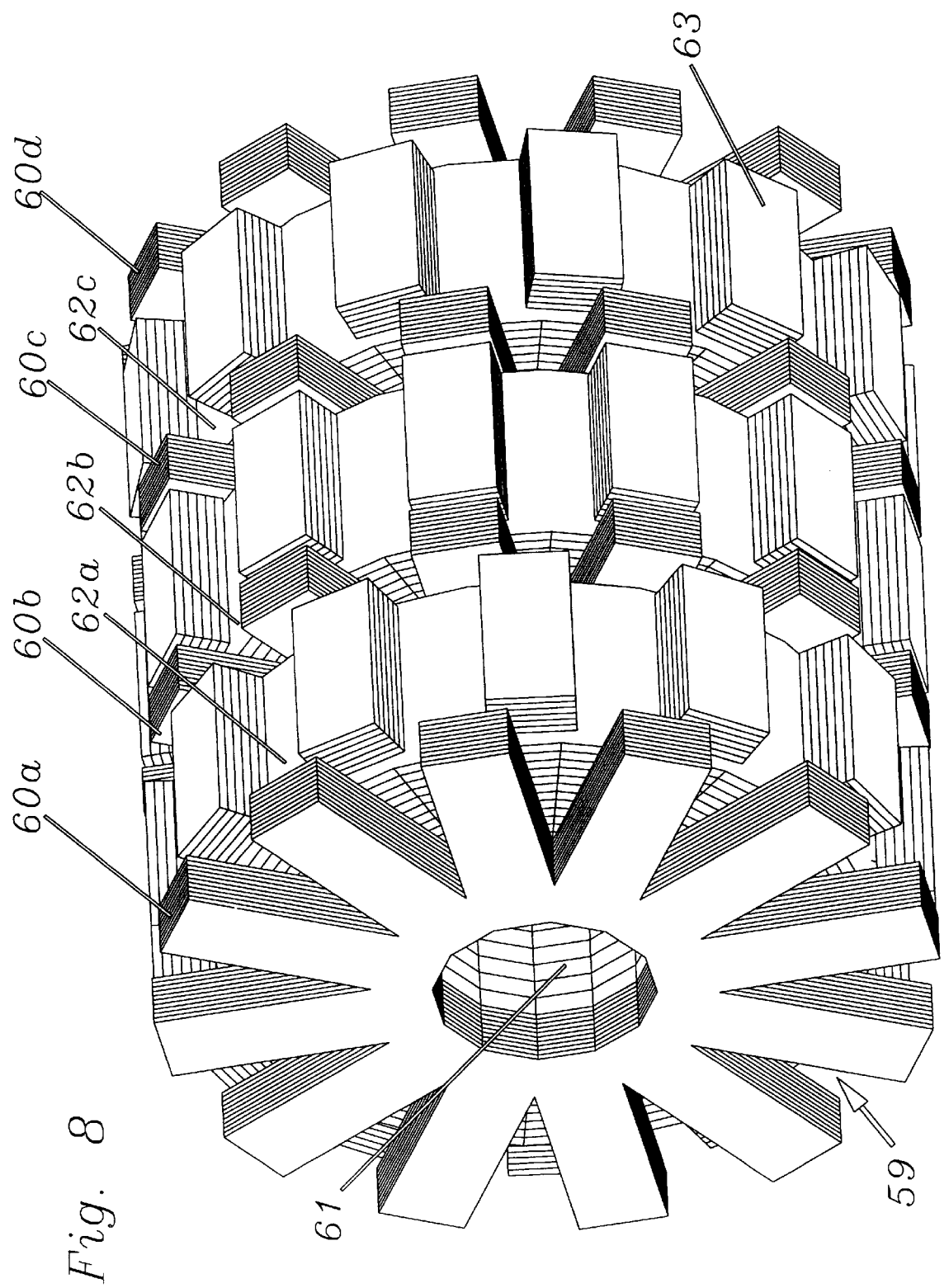
FIG. 8 shows an isometric view of the active piece parts from FIG. 6.

In FIG. 8, the magnetically and electrically active design elements of a three-phase drive are shown. The soft magnetic body (59) of the 36-pole stator consists herein of four identical star discs (60a–d) and three identical ring cores (61). These prefabricated piece parts and the three identical conductor rings (62a–c) are assembled alternately in axial direction. The current supply of the middle conductor ring (62b) occurs preferably at the bottom of the groove by adjacent phases or through holes and/or slits in the ring core. The soft magnetic block segments (63) of the different phases which are offset by ⅓ pole pitch in relation to each other are advantageously initially cast into identical rings which are axially toothed to that the offset is ensured during assembly. In high-pole annular drives, the star discs (60a–d) may also be manufactured from grain oriented electric sheets wherein the stamped parts comprise only few pole pitches.

For drives of highest power density, an additional increase of the number of phases is advantageous wherein the portion of the multiply utilized mass as well as the width of the current blocks may be increased to, e.g. ⅖ or 3/7 of the period.

I claim:

1. A transverse flux machine comprising: conductor rings and u-shaped soft magnetic bodies, said u-shaped soft magnetic bodies having ends, said conductor rings being enclosed on three sides by said u-shaped soft magnetic bodies; said machine further having magnetic circuits enclosing said conductor rings and being concentrated in said u-shaped soft magnetic bodies and in soft magnetic parts or hard magnetic parts or constructions made of soft and hard magnetic parts, said soft magnetic parts or hard magnetic parts or constructions made of soft and hard magnetic parts being moveable in relation to said conductor rings and being separated from said u-shaped bodies by air gaps, said magnetic circuit being closed periodically, wherein said air gaps are arranged radially outside said conductor rings and said moveable parts of the rotor or stator are partially arranged within said ends of said u-shaped soft magnetic body.

2. A transverse flux machine as recited in claim 1, wherein the u-shaped soft magnetic body is divided into at least two parts.

3. A transverse flux machine as recited in claim 1, wherein said u-shaped soft magnetic body is divided into 3 segments which conduct the magnetic flow predominantly into one direction and wherein the said segments placed oppositely are identical.

4. A transverse flux machine as recited in claim 1, wherein star-shaped flat discs conduct the magnetic flux radially toward the outer circumference.

5. A transverse flux machine as recited in claim 1, wherein said machine comprises hard magnetic parts and said hard magnetic parts are ring-shaped and magnetized in opposite directions.

6. A transverse flux machine as recited in claim 1, wherein said ends of said u-shaped soft magnetic bodies have surfaces to said air gap, said surfaces extend simultaneously in axial and radial direction.

7. A transverse flux machine as recited in claim 1, said machine comprising constructions made of soft and hard magnetic parts that close said magnetic circuit and said soft magnetic parts having ends, wherein said ends of said soft magnetic parts are beveled and said hard magnetic parts are arranged opposite the beveled ends of said soft magnetic parts and wherein said beveled ends of said soft magnetic parts have a beveling angle with reference to the rotational axis of between 45 and 70°.

8. A transverse flux machine as recited in claim 1, wherein said conductor ring consists of wound rectangular profile conductors or of hard anodized aluminum strip.

9. A transverse flux machine comprising: conductor rings and u-shaped soft magnetic bodies, said u-shaped soft magnetic bodies having ends, said conductor rings being enclosed on three sides by said u-shaped soft magnetic bodies; said machine further having magnetic circuits enclosing said conductor rings and being concentrated in said u-shaped soft magnetic bodies and in soft magnetic parts or hard magnetic parts or constructions made of soft and hard magnetic parts, said soft magnetic parts or hard magnetic parts or constructions made of soft and hard magnetic parts being moveable in relation to said conductor rings and being separated from said u-shaped bodies by air gaps, said magnetic circuit being closed periodically, said air gaps being arranged radially outside said conductor rings, wherein said u-shaped shaped soft magnetic bodies contain comb-shaped segments, said comb-shaped segments consisting of tangentially layered stamped parts and enclosing at least two conductor rings on three sides, wherein parts of said comb-shaped segments arranged between two conductor rings are alternately flown through by the flux of different phases and wherein said conductor rings of different phases are separated by said soft magnetic bodies which said conductor rings jointly utilize.

10. A transverse flux machine as recited in claim 9, wherein each magnetic circuit created from one conductor ring in said u-shaped soft magnetic bodies is closed simultaneously by magnetic parts wherein said magnetic parts are arranged radially outside said conductor ring.

* * * * *